United States Patent [19]

Boyer

[11] Patent Number: 5,772,699
[45] Date of Patent: Jun. 30, 1998

[54] STABLE AQUEOUS REACTIVE DYE COMPOSITION AND METHOD FOR STABILIZING AN AQUEOUS REACTIVE DYE COMPOSITION

[75] Inventor: Andrew D. Boyer, Denver, Pa.

[73] Assignee: Crompton & Knowles Corporation, Stamford, Conn.

[21] Appl. No.: 799,023

[22] Filed: Feb. 10, 1997

Related U.S. Application Data

[63] Continuation-in-part of Ser. No. 402,852, Mar. 13, 1995, abandoned.

[51] Int. Cl.$^6$ .......................... D06P 1/382; C09B 62/503
[52] U.S. Cl. .......................... 8/549; 8/594; 8/597; 8/599; 8/602; 8/603; 8/661
[58] Field of Search .......................... 8/543–549, 594, 8/597, 599, 602, 603, 661

[56] References Cited

U.S. PATENT DOCUMENTS

| | | | |
|---|---|---|---|
| 3,741,719 | 6/1973 | Ramanathan et al. | 8/39 |
| 3,803,168 | 4/1974 | Kolliker et al. | 260/326 C |
| 3,956,271 | 5/1976 | Blass et al. | 260/208 |
| 3,980,426 | 9/1976 | Feess et al. | 8/21 |
| 4,017,256 | 4/1977 | Kogel et al. | 8/21 C |
| 4,078,885 | 3/1978 | Opitz et al. | 8/1 A |
| 4,083,849 | 4/1978 | Quadbeck-Seeger | 260/294.9 |
| 4,087,245 | 5/1978 | Kramer et al. | 8/85 A |
| 4,094,634 | 6/1978 | Becker et al. | 8/1 W |
| 4,149,850 | 4/1979 | Schuläfer et al. | 8/41 R |
| 4,231,749 | 11/1980 | Ballard | 8/584 |
| 4,284,782 | 8/1981 | Schmidt | 546/288 |
| 4,443,270 | 4/1984 | Biard et al. | 134/25.2 |
| 4,448,583 | 5/1984 | Corso | 8/527 |
| 4,465,491 | 8/1984 | Balliello et al. | 8/524 |
| 4,468,230 | 8/1984 | Thomas et al. | 8/528 |
| 4,487,610 | 12/1984 | Mäusezahl | 8/524 |
| 4,548,612 | 10/1985 | Kayane et al. | 8/524 |
| 4,673,410 | 6/1987 | Sandefur et al. | 8/528 |
| 4,693,725 | 9/1987 | Yamauchi et al. | 8/527 |
| 4,701,182 | 10/1987 | Von der Eltz | 8/549 |
| 4,749,380 | 6/1988 | Yamauchi et al. | 8/527 |
| 4,764,175 | 8/1988 | Doré et al. | 8/437 |
| 4,832,698 | 5/1989 | Ikeou et al. | 8/527 |
| 4,875,903 | 10/1989 | Pedrazzi | 8/640 |
| 4,976,744 | 12/1990 | Dix et al. | 8/527 |
| 5,009,669 | 4/1991 | Jóllenbeck et al. | 8/573 |
| 5,015,262 | 5/1991 | Ohba et al. | 8/543 |
| 5,047,064 | 9/1991 | Rizzardi | 8/125 |
| 5,242,466 | 9/1993 | Aseervatham et al. | 8/543 |

OTHER PUBLICATIONS

Kirk–Othmer Chemical Encyclopedia, Third Edition, 8:p815 (1989).
The Society of Dyers and Colourists, "Reactive Dyes, " Colour Index vol. 3 (3d ed. 1971), 3391–92.
"Major Producers of EDTA Type Chelating Agents," CIBA–GEIGY Corp. (1973).
Kowalski, "Sequestering Agents in Bleaching and Scouring," Textile Chemist and Colorist (Monsanto Co., Aug. 1978).
Imada, Sasakura and Yoshida, "Dyeing Cellulose/Wool Blends with Bifunctional Fiber Reactive Dyes," Textile Chemist and Colorist, vol. 22, No. 11 (Nov. 1990), 18.
Hildebrand, "Reactive Dyes: Application and Properties," The Chemistry of Synthetic Dyes, vol. VI (1972), 327.
Siegel, "Reactive Dyes: Reactive Groups," The Chemistry of Synthetic Dyes, vol. VI (1972) 2–5.
Dyes and Pigments by Colour Index Generic Names, American Association of Textile Chemists & Colourists Buyer's Guide, vol. 24, No. 7 (Jul. 1992), 108 "Reactive Yellow 111".
Zollinger, Color Chemistry Syntheses, Properties and Applications of Organic Dyes and Pigments (2d ed. 1991) 169–70.
Fujioka et al., "Development of Novel Reactive Dyes With a Mixed Bifunctional Reactive System," Sumitomo Technical Information, Sumitomo Chem. Co., Ltd. (between 1980–1992).
Parfitt, G.D., "Fundamental Aspects of Dispersion," Dispersion of Powders in Liquids, 81 (1969).

Primary Examiner—Margaret Einsmann
Attorney, Agent, or Firm—Daniel Reitenbach; Paul Grandinetti

[57] ABSTRACT

An aqueous reactive dye composition is disclosed. The aqueous reactive dye composition has improved storage stability and contains a water-soluble reactive dye and a chelating agent. The chelating agent is present in a sufficient concentration to maintain the pH of the aqueous reactive dye composition in the range of about 3.0 to about 7.0 and, preferably, about 5.0 to about 6.5. Desirable chelating agents are dicarboxylic acids, such as succinic acid, or amino carboxylates, such as nitrilotriacetic acid. A method of stabilizing an aqueous reactive dye composition is disclosed and includes the step of dissolving a polycarboxylic acid or an amino carboxylate in an aqueous solution of a water-soluble reactive dye in a sufficient concentration to stabilize the pH of the composition.

19 Claims, No Drawings

5,772,699

STABLE AQUEOUS REACTIVE DYE COMPOSITION AND METHOD FOR STABILIZING AN AQUEOUS REACTIVE DYE COMPOSITION

CROSS-REFERENCE TO RELATED APPLICATION

This is a continuation-in-part of U.S. application Ser. No. 08/402,852, filed Mar. 13, 1995 now abandoned.

BACKGROUND OF THE INVENTION

1. Field of the Invention

The present invention is a stable aqueous reactive dye composition having an enhanced shelf life and a method for stabilizing the aqueous dye composition. More particularly, the invention relates to aqueous reactive dye compositions containing one or more chelating agents in an amount sufficient to maintain the pH of the reactive dye composition in a range that inhibits decomposition of the reactive dye. A further aspect of the invention relates to a method for stabilizing an aqueous reactive dye composition by adding a chelating agent.

2. Background of the Invention

Reactive dye compositions have been used for many years to provide a high level of dyeing that is more colorfast than many other forms of dyeing. Reactive dye compositions in aqueous forms are particularly desirable because the dye can be handled without producing toxic dust and can be used with minimal environmental impact. Aqueous dye compositions are also easily dissolved in a dyeing bath.

Water soluble reactive dyes bind with the material being dyed by forming a covalent bond between a dye molecule and a fiber of the material. Typically, materials that are dyed by reactive dyes are cotton, wool, and nylon. Reactive dyes comprise a chromophore and at least one reactive group. The chromophore, which defines the color of the dye, is usually an azo, anthraquinone, or phthalocyanine residue. The reactive group typically is attached to the chromophore through a bridging group. The chromophore affects the shade, strength, and affinity of the dye while the reactive group affects the reactivity and stability of the dye-to-fiber bond.

One of the several types of reactive dyes includes a vinylsulfone group such as a sulfatoethylsulfonyl group. The sulfatoethylsulfonyl group is generally stable under acid conditions, but undergoes hydrolysis under alkaline conditions. The sulfatoethylsulfonyl is subject to decomposition, during "long term storage" or storage of at least three months, to the hydroxyethylsulfonyl and vinylsulfonyl forms. Although the vinylsulfonyl form is reactive, this form is less soluble in an aqueous environment. The less soluble form of the dye can precipitate from concentrated solutions, thereby making the composition cloudy and difficult to dissolve in the dye bath. To improve the storage stability of the dye, buffers are usually added to maintain the pH of dye solutions in the acidic region.

Aqueous reactive dyes containing a buffer can also be subject to decomposition during storage. A large amount of the buffer can result in a "salting out" effect that can lower the solubility of the dye. These and numerous other efforts to produce a storage-stable aqueous reactive dye composition have met with limited success.

U.S. Pat. No. 4,749,380 to Yamauchi et al. discloses a reactive dye-containing aqueous composition containing 5 to 50 percent by weight of a reactive dye, 0.1 to 1.0 percent by weight of a buffer, and up to 10 percent of an inert substance. The disclosed buffers include ammonium, sodium, or potassium salts of formic, acetic, oxalic, or boric acid. The inert substance can be an inorganic salt, a surfactant, an auxiliary agent for dyeing, a hydrotropic agent, a defoaming agent, an antifreeze agent, or an antiseptic.

U.S. Pat. No. 4,448,583 to Corso discloses a stabilized dye composition containing a reactive dye and a water soluble inorganic salt. The composition is substantially free of buffer substances. The pH of the composition is about 2.5 to 4.5.

The industry lacks aqueous reactive dye compositions that are stable during extended storage periods. Accordingly, there is a continuing need in the industry to provide stabilized aqueous reactive dye compositions without interfering with the dyeing processes and to provide a method for stabilizing aqueous reactive dye compositions.

SUMMARY OF THE INVENTION

The invention is an aqueous reactive dye composition. The reactive dye composition is stable to decomposition during an extended storage period. The aqueous reactive dye composition includes a water soluble reactive dye and a chelating agent. The chelating agent is in an amount or concentration sufficient to maintain the pH of the aqueous reactive dye composition from about 3 to about 7.

The invention is also a method for stabilizing an aqueous reactive dye composition. The method includes the step of forming an aqueous solution having at least one reactive dye.

The reactive dye desirably has at least one —$SO_3H$ reactive group and has at least one —$SO_2CH_2CH_2OSO_3H$ reactive group. The method also includes the step of adding a chelating agent to the aqueous solution in an amount sufficient to maintain the pH of the aqueous reactive dye composition from about 3 to about 7.

DETAILED DESCRIPTION OF THE INVENTION

The invention is an aqueous reactive dye composition and a method for producing an aqueous reactive dye composition that is stable for extended storage periods. In particular, the invention is an aqueous reactive dye composition having a stable pH from about 3 to about 7 during an extended storage period. For purposes of this invention, an extended storage period for an aqueous reactive dye composition is at least three months and often six months or more.

Suitable reactive dyes for use with this invention are commercially available and typically formed from a concentrate solution containing about 5.0 weight percent to a 50.0 weight percent of a selected reactive dye. Desirable reactive dyes are water soluble. The reactive dye compositions are generally prepared by combining the components and thoroughly mixing the components to form a true solution. The reactive dye can contain 1, 2, 3, or more reactive groups. Preferred embodiments of the reactive dye used with this invention include a water soluble reactive dye desirably having at least one —$SO_3H$ reactive group and having at least one —$SO_2CH_2CH_2OSO_3H$ reactive group. The preferred reactive group at this site is the —$SO_2CH_2CH_2OSO_3H$ group. Other reactive groups can also be included in desirable reactive dyes. Examples of suitable commercially available liquid reactive dyes include Reactive Blue 250, Reactive Yellow 15, Reactive Red 239, and Reactive Violet 5.

In desirable embodiments of the invention, suitable dye compositions can include, but are not limited to, reactive dyes of the following formulas.
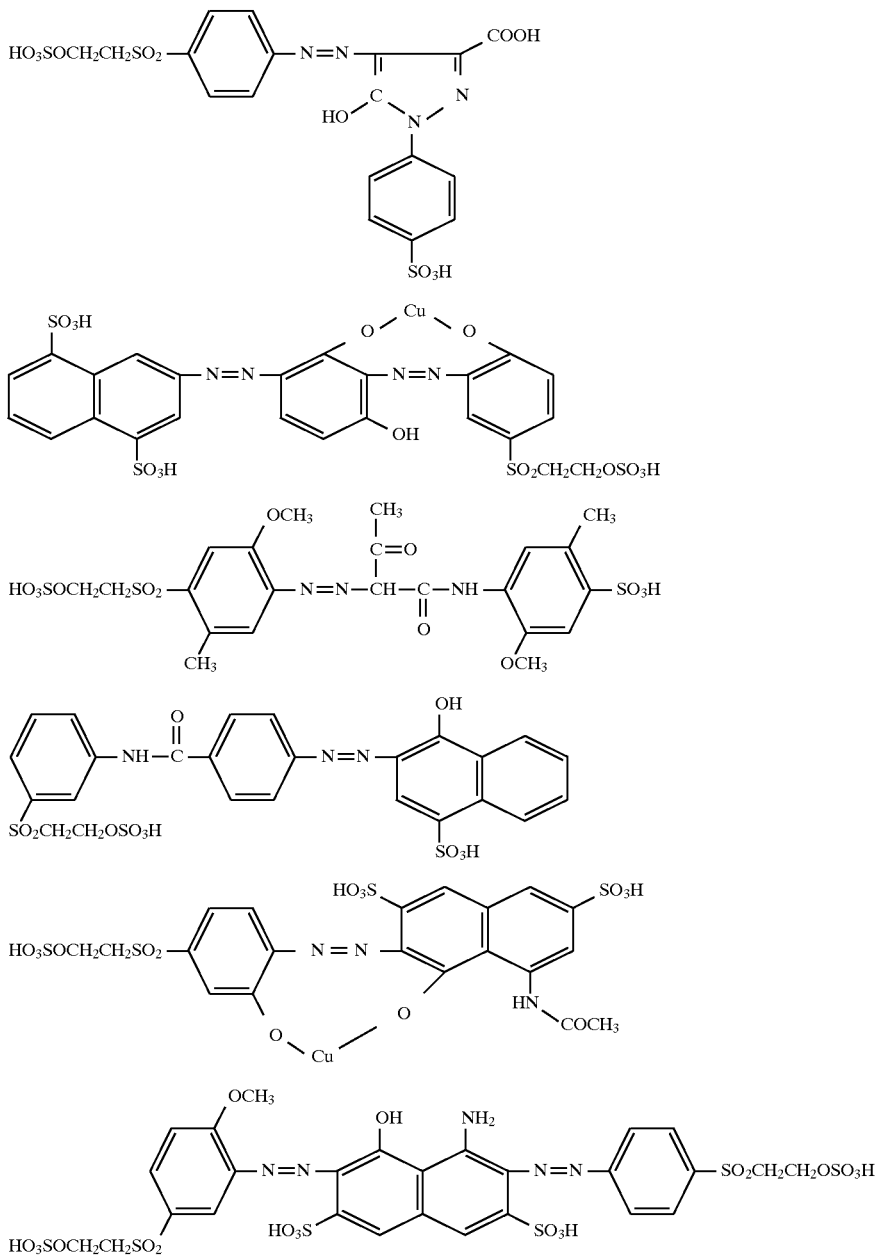
In further embodiments the reactive dye can include one or more of the following dyes.
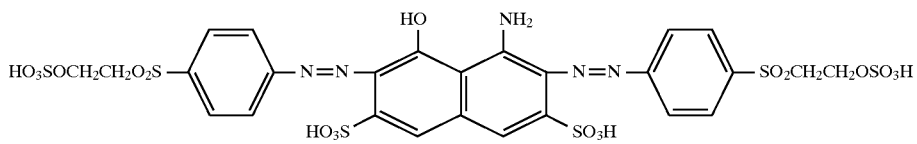

-continued
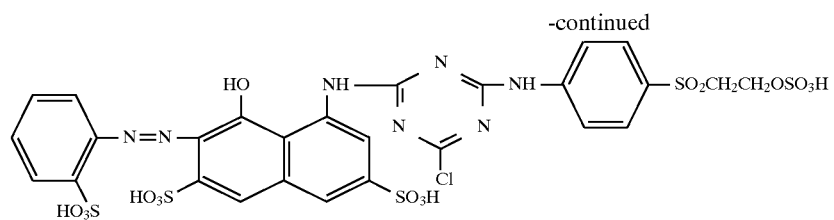
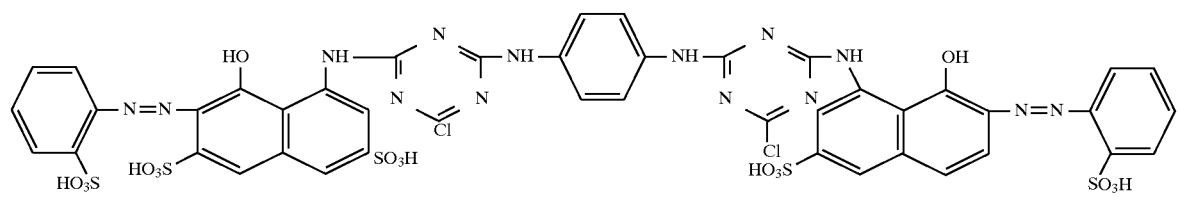
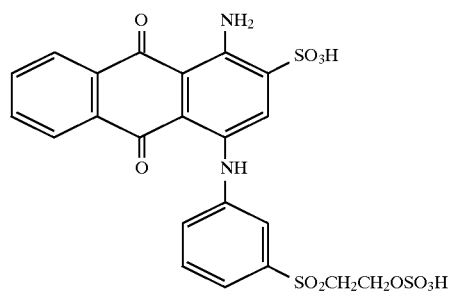
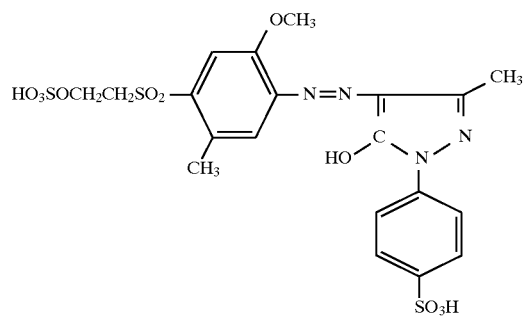
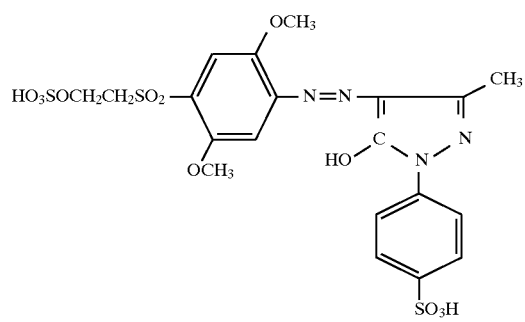
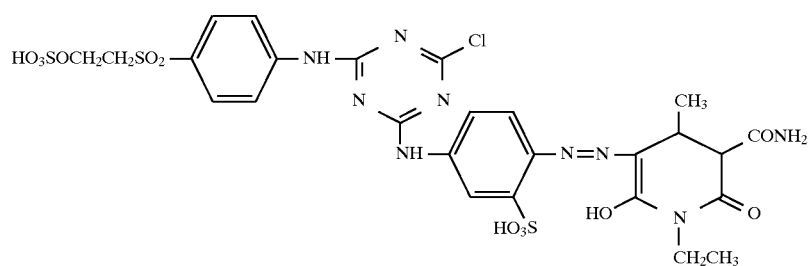

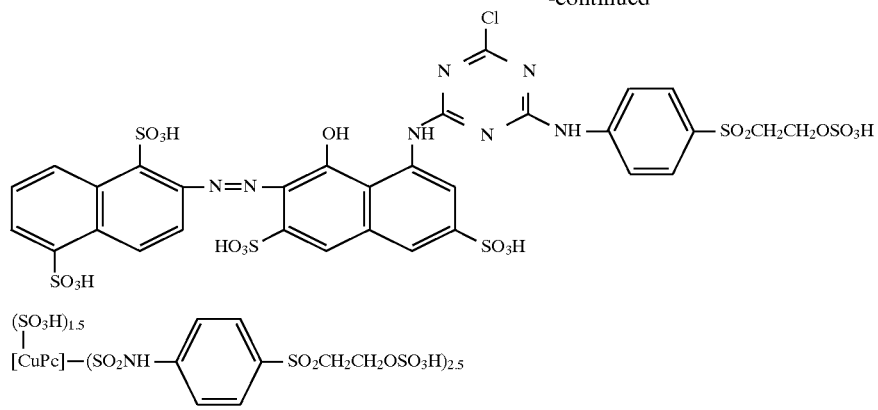

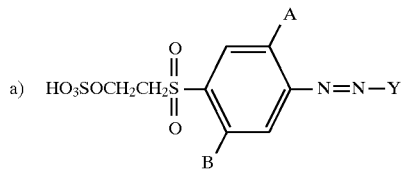

where CuPc is copper phthalocyanine

In preferred embodiments of the invention, the reactive dyes are:

a) 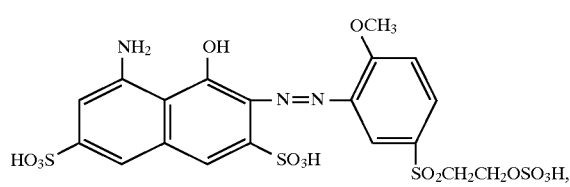

where A is —OCH₃ or —H,
B is —OCH₃, —CH₃, or —H, and
Y is

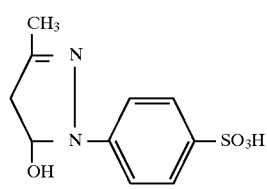

b) 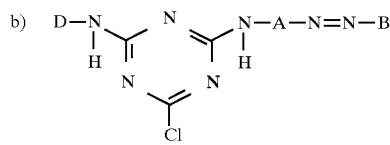

where A is

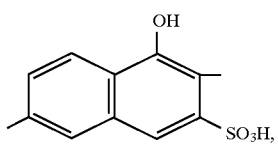

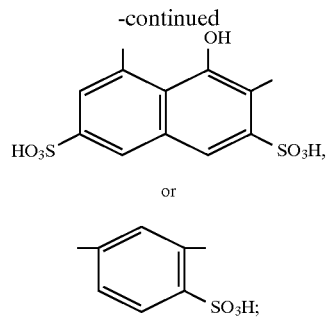

or

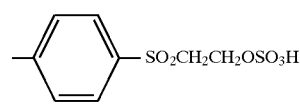

B is

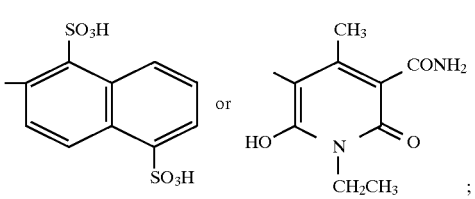

and D is

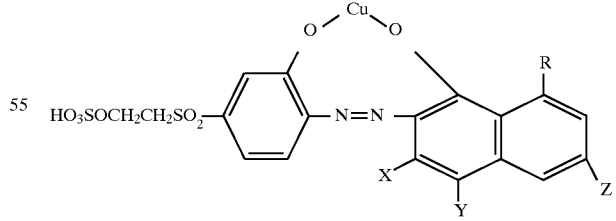

and c)

where R is —H or —NHCOCH₃, X is —H or —SO₃H, Y is —H or —SO₃H, and Z is —H or —SO₃H.

The chelating agent, in an aqueous reactive dye composition according to this invention, provides a chelating function and pH buffering function. The chelating agent stabilizes the pH of an aqueous reactive dye in an aqueous solution. Generally, aqueous reactive dye compositions have an initial pH of greater than about 6.5. Aqueous reactive dye compositions have a limited shelf life due to an unacceptably fast rate of decomposition of the reactive dye. The decomposition by-products of the reactive dye typically cause the pH of the aqueous reactive dye composition to decrease, thereby further accelerating the rate of decomposition of the reactive dye. Depending on the specific reactive dye, the pH of the aqueous reactive dye composition can decrease from about 6.5 to about 4.0 within a few weeks. The chelating agent neutralizes the acid formed by the decomposition of the reactive dye and can maintain the pH of the aqueous reactive dye composition in a "stabilized range" to inhibit decomposition.

The chelating agent is combined with the reactive dye concentrate solution in a sufficient concentration to stabilize the aqueous reactive dye composition. This concentration of chelating agent varies depending upon the type and concentration of reactive dye and other compounds in the aqueous reactive dye composition. The chelating agent is added to the aqueous reactive dye composition in an amount such that the resulting composition has a pH of about 3.0 to about 7.0 and, preferably, from about 5.0 to about 6.5. A desirable concentration of chelating agent for use with this invention is a concentration of at least one chelating agent from about 0.1 to about 3.0 weight percent. In more desirable embodiments, the chelating agent is added in an amount of about 0.25 to about 2.0 weight percent based on the total weight of the aqueous reactive dye composition and, preferably, about 0.5 to about 1.5 weight percent.

The preferred chelating agent is a member selected from the group consisting of polycarboxylic acids, amino carboxylates, and mixtures of these. In preferred embodiments, the polycarboxylic acids and amino carboxylates are in the "free acid" form or salts selected from the group consisting of ammonium, sodium, lithium, and mixtures of these. Potassium salts can be suitable for use with the invention, with selected dyes "salting out" certain reactive dyes when the potassium salt is present in a strong concentration.

Examples of desirable polycarboxylic acids include $C_2$-$C_{10}$ dicarboxylic acids, preferably, $C_3$-$C_9$ dicarboxylic acids. More preferably, the dicarboxylic acids are selected from the group consisting of succinic acid, tartaric acid, glutaric acid, adipic acid, and mixtures of these. The most preferred polycarboxylic acid is succinic acid.

The amino carboxylates that can be used in the invention include, for example, nitrilotriacetic acid (NTA), ethylenediaminetetraacetic acid (EDTA), diethlenetriaminepentaacetic acid (DTPA), 1,2-diaminocyclohexane tetraacetic acid (CDTA), ethylenediamine-di-o-hydroxyphenylacetic acid (EDHPA), dihydroxyethylglycine (DHEG), diaminoethyl ether tetraacetic acid, ethylene glycol-bis(B-aminoethyl ether)-N,N-tetraacetic acid (EGTA), (triethylenetetraamine) hexaacetic acid (TTHA), iminodiacetic acid (IDA), N-hydroxyethyliminodiacetic acid (HIMDA), 1,2-propylenediaminetetraacetic acid (PDTA), (1,3-diaminopropan-2-ol) tetraacetic acid (DPTA), (N,N'-dihydroxyethyl)ethylenediaminediacetic acid (HEEDA), (N-hydroxyethyl)ethylenediaminetriacetic acid (N-HEDTA), and mixtures of these. The preferred amino carboxylate is nitrilotriacetic acid. The addition of the chelating agent to aqueous reactive dye compositions has a stabilizing affect on the reactive dye. The chelating agent maintains the pH of the composition in the range of about 3 to about 7 and, preferably, about 5.0 to about 6.5. The shelf life of the aqueous reactive dye composition is increased to about one year because the pH generally varies less than about 0.05 pH units over about three months and usually less than about 0.05 to about 0.1 pH unit over a period of about six months. The resulting aqueous reactive dye composition exhibits a stable pH range for about six to about twelve months with negligible decomposition of the reactive dye.

The method for stabilizing the reactive dye includes the initial step of forming an aqueous solution of the reactive dye. The solution preferably contains about 5.0 to about 50.0 weight percent of the reactive dye. The resulting aqueous reactive dye composition generally has a pH of about 4.0 to about 6.5 in the absence of a stabilizing agent. The stabilizing agent in the form of a chelating agent is added to the aqueous reactive dye so that the chelating agent is present in an amount of about 0.1 to about 3.0 weight percent based on the total weight of the solution or aqueous reactive dye composition, preferably, about 0.5 weight percent to about 1.5 weight percent. The chelating agent is generally added in an amount so that the pH of the initial solution typically lowers by less than 0.5 of a pH unit after a six month storage period. An aqueous reactive dye composition containing 1.0 weight percent of a chelating agent is stable for periods up to a year without significant decomposition of the reactive dye or "salting out" of the reactive dye.

The following examples demonstrate the advantages of particular embodiments of the invention. Each of the examples uses commercially available reactive dyes and additives for stabilizing the resulting aqueous reactive dye composition.

EXAMPLE 1

This example shows the stability of aqueous reactive dye compositions after storage. The reactive dye of this example is the liquid form of C.I. Reactive Yellow 15. Aqueous compositions of this reactive dye are tested for stability in this example. The 2-bromo-2-(bromomethyl) pentanedinitrile used in this example and the other examples is sold under the trademark Tektamer 38 A.D. in a 0.2 percent concentration.

A Control Sample is prepared from 44.2 grams of dye crude, 0.4 gram of Tektamer 38 A.D., and 236 grams of deionized water. A first test sample (Sample I) is prepared from 56.1 grams of the dye crude, 0.6 gram of Tektamer 38 A.D., 0.2 gram sodium acetate, 1.4 grams hydroxypropyl B-cyclodextrin (HPBCD) (0.5 percent solution), and 239.3 grams of deionized water. A second test sample (Sample II) is prepared from 56.1 grams of the dye crude, 4.3 grams of (1.5 weight percent) succinic acid (SA), 1.4 grams of (0.5 weight percent) nitrilotriacetic acid (NTA), 0.6 gram Tektamer 38 A.D., 4.1 grams sodium acetate, and 230.8 grams of deionized water.

The samples are each separated into two portions. One portion of each sample is stored at room temperature and the other portion is stored at 40° C. for three weeks. The initial pH and the pH after three weeks of storage of the samples are recorded in Table 1.

TABLE 1

| Sample | Storage Temperature | Initial pH | pH After 3 Weeks | pH Change |
| --- | --- | --- | --- | --- |
| Control | Room Temp. | 4.99 | 4.85 | −0.14 |
| Control | 40° C. | 4.99 | 4.71 | −0.28 |
| I (HPBCD) | Room Temp. | 5.15 | 5.01 | −0.14 |
| I (HPBCD) | 40° C. | 5.15 | 4.85 | −0.30 |
| II (SA/NTA) | Room Temp. | 4.83 | 4.78 | −0.05 |
| II (SA/NTA) | 40° C. | 4.83 | 4.81 | −0.02 |

The data of Table 1 show a stabilizing effect of the combination of succinic acid and nitrilotriacetic acid and no stabilizing effect for HPBCD, a compound outside the scope of the present invention. The data further show that the stabilizing effect is not significantly dependent on the storage temperature.

EXAMPLE 2

This example shows the stability of aqueous reactive dye compositions after storage. The reactive dye of this example is the liquid form of C.I. Reactive Yellow 15 Liquid. A Control Sample and Samples I through VI are prepared as follows using the procedure of Example 1.

| Control: | 35.5 grams | dye crude |
| --- | --- | --- |
| | 0.4 gram | Tektamer 38 A.D. |
| | 0.5 gram | sodium acetate |
| | 167.8 grams | deionized water |
| Sample I: | 40.5 grams | dye crude |
| | 0.5 gram | Tektamer 38 A.D. |
| | 1.2 grams | hydroxypropyl β-cyclodextrin (HPBCD) (0.5 percent) |
| | 0.8 gram | sodium acetate |
| | 190.1 grams | deionized water |
| Sample II: | 40.3 grams | dye crude |
| | 0.5 gram | Tektamer 38 A.D. |
| | 3.5 grams | succinic acid (1.5 percent) (SA) |
| | 1.2 grams | nitrilotriacetic acid (NTA) (0.5 percent) |
| | 7.9 grams | sodium acetate |
| | 178.7 grams | deionized water |
| Sample III: | 42.5 grams | dye crude |
| | 0.5 gram | Tektamer 38 A.D. |
| | 4.9 grams | sodium nitrite (2 percent) (NaNO$_2$) |
| | 197.0 grams | deionized water |
| Sample IV: | 39.8 grams | dye crude |
| | 0.5 gram | Tektamer 38 A.D. |
| | 1.8 grams | monobasic sodium phosphate (MSP) (0.8 percent) |
| | 2.8 grams | dibasic sodium phosphate (1.2 percent) (DSP) |
| | 184.5 grams | deionized water |
| Sample V: | 41.3 grams | dye crude |
| | 0.5 gram | Tektamer 38 A.D. |
| | 4.8 grams | sodium acetate (2 percent) (NaOAc) |
| | 0.5 gram | acetic acid |
| | 190.9 grams | deionized water |
| Sample VI: | 54.1 grams | dye crude |
| | 0.6 gram | Tektamer 38 A.D. |
| | 4.7 grams | malic acid |
| | 9.0 grams | sodium acetate |
| | 243.1 grams | deionized water |

Each of the samples is separated into two portions and cooled to 3° C. for seven hours. One of the two portions of each sample is then stored at room temperature while the other portion of the sample is stored at 40° C. for three weeks. The initial pH and the pH after three weeks of storage are shown in Table 2.

TABLE 2

| Sample | Storage Temperature | Initial pH | pH After 3 Weeks | pH Change |
| --- | --- | --- | --- | --- |
| Control | Room Temp. | 5.40 | 5.32 | −0.08 |
| Control | 40° C. | 5.40 | 5.10 | −0.30 |
| I (HPBCD) | Room Temp. | 5.49 | 5.39 | −0.10 |
| I (HPBCD) | 40° C. | 5.49 | 5.12 | −0.37 |
| II (SA/NTA) | Room Temp. | 4.88 | 4.88 | 0.0 |
| II (SA/NTA) | 40° C. | 4.88 | 4.89 | +0.01 |
| III (NaNO$_2$) | Room Temp. | 5.62 | 6.29 | +0.67 |
| III (NaNO$_2$) | 40° C. | 5.62 | 6.14 | +0.52 |
| IV (MSP/DSP) | Room Temp. | 6.01 | 5.79 | −0.22 |
| IV (MSP/DSP) | 40° C. | 6.01 | 5.67 | −0.34 |
| V (NaOAc) | Room Temp. | 5.59 | 5.58 | −0.01 |
| V (NaOAc) | 40° C. | 5.59 | 5.48 | −0.11 |
| VI (malic) | Room Temp. | 4.80 | 4.83 | +0.03 |
| VI (malic) | 40° C. | 4.80 | 4.81 | +0.01 |

The data of Table 2 show that the stabilizing effect of the chelating agents of the present invention (Samples II and VI) is not significantly dependent on the storage temperature, whereas less desirable effects are exhibited by compounds outside the scope of the present invention (Samples I, III, IV, and V).

EXAMPLE 3

This example shows the stability of aqueous reactive dye compositions after an extended storage period. The reactive dye of this example is the liquid form of C.I. Reactive Blue 250 Liquid. A Control Sample and Samples I through VI are prepared as follows using the procedure of Example 1.

| Control: | 38.1 grams | dye crude |
| --- | --- | --- |
| | 0.4 gram | Tektamer 38 A.D. |
| | 1.1 grams | sodium acetate |
| | 168.1 grams | deionized water |
| Sample I: | 39.1 grams | dye crude |
| | 0.4 gram | Tektamer 38 A.D. |
| | 3.1 grams | succinic acid (SA) |
| | 1.0 gram | nitrilotriacetic acid (NTA) |
| | 7.8 grams | sodium acetate |
| | 194.7 grams | deionized water |
| Sample II: | 36.7 grams | dye crude |
| | 0.4 gram | Tektamer 38 A.D. |
| | 6.8 grams | sodium acetate |
| | 2.9 grams | succinic acid (SA) |
| | 181.1 grams | deionized water |
| Sample III: | 39.2 grams | dry crude |
| | 0.4 gram | Tektamer 38 A.D. |
| | 1.1 grams | nitrilotriacetic acid (NTA) |
| | 4.2 grams | sodium acetate |
| | 182.9 grams | deionized water |
| Sample IV: | 37.9 grams | dye crude |
| | 0.4 gram | Tektamer 38 A.D |
| | 3.0 grams | nitrilotriacetic acid (NTA) |
| | 8.2 grams | sodium acetate |
| | 190.5 grams | deionized water |
| Sample V: | 38.1 grams | dye crude |
| | 0.4 gram | Tektamer 38 A.D. |
| | 2.0 grams | disodium hydrogen phosphate (DSP |
| | 2.0 grams | monopotassium hydrogen phosphate (MKP) |
| | 164.3 grams | deionized water |
| Sample VI: | 38.0 grams | dye crude |
| | 0.5 gram | Tektamer 38 A.D. |
| | 3.0 grams | malic acid (MA) |
| | 8.5 grams | sodium acetate |
| | 192.1 grams | deionized water |

Each of the samples is separated into two portions. One of the two portions of each sample is then stored at room temperature while the other portion of the sample is stored at 40° C. for three weeks. The initial pH and the pH after three weeks of storage are shown in Table 3.

TABLE 3

| Sample | Storage Temp. | Initial pH | pH After 3 Weeks | pH Change | pH After 20 Mos. | pH Change |
|---|---|---|---|---|---|---|
| Control | Room Temp. | 5.58 | 5.41 | −0.17 | 4.70 | −0.88 |
| Control | 40° C. | 5.58 | 5.18 | −0.40 | Not Tested | — |
| I (SA/NTA) | Room Temp. | 4.93 | 4.99 | +0.06 | 5.02 | +0.09 |
| I (SA/NTA) | 40° C. | 4.93 | 4.99 | +0.06 | Not Tested | — |
| II (SA) | Room Temp. | 5.02 | 5.08 | +0.06 | 5.08 | +0.06 |
| II (SA) | 40° C. | 5.02 | 5.09 | +0.07 | Not Tested | — |
| III (NTA) | Room Temp. | 5.23 | 5.28 | +0.05 | 5.06 | −0.17 |
| III (NTA) | 40° C. | 5.23 | 5.21 | −0.02 | Not Tested | — |
| IV (NTA) | Room Temp. | 5.09 | 5.14 | +0.05 | 5.13 | +0.04 |
| IV (NTA) | 40° C. | 5.09 | 5.15 | +0.06 | Not Tested | — |
| V (DSP/MKP) | Room Temp. | 6.43 | 6.09 | −0.34 | 4.28 | 2.15 |
| V (DSP/MKP) | 40° C. | 6.43 | 5.45 | −0.98 | Not Tested | — |
| VI (MA) | Room Temp. | 4.95 | 5.01 | +0.06 | 5.02 | +0.07 |
| VI (MA) | 40° C. | 4.95 | 5.01 | +0.06 | Not Tested | — |

The data of Table 3 show the stabilizing effect of the chelating agents of the present invention (Samples I, II, III, IV, and VI) over an extended storage period, whereas the compound outside the scope of the present invention (Sample V) did not show the desired stabilizing effect.

EXAMPLE 4

This example shows the stability of aqueous reactive dye compositions after an extended storage period. The reactive dye of this example is sold in the trade under the name Reactive Red 239 Liquid. A Control Sample and Samples I through XII are prepared as follows using the procedure of Example 1.

| | | |
|---|---|---|
| Control: | 70.3 grams | dye crude |
| | 0.7 gram | Tektamer 38 A.D. |
| | 297.3 grams | deionized water |
| Sample I: | 68.3 grams | dye crude |
| | 0.7 gram | Tektamer 38 A.D. |
| | 1.8 grams | succinic acid |
| | 7.1 grams | sodium acetate |
| | 285.5 grams | deionized water |
| Sample II: | 47.9 grams | dye crude |
| | 0.5 gram | Tektamer 38 A.D. |
| | 1.3 grams | nitrilotriacetic acid (NTA) |
| | 3.5 grams | sodium acetate |
| | 198.0 grams | deionized water |
| Sample III: | 51.6 grams | dye crude |
| | 0.5 gram | Tektamer 38 A.D. |
| | 2.7 grams | Versene 220 (EDTA tetrasodium salt) |
| | 0.7 gram | acetic acid |
| | 214.6 grams | deionized water |
| Sample IV: | 51.1 grams | dye crude |
| | 0.5 gram | Tektamer 38 A.D. |
| | 2.8 grams | monopotassium phosphate (MKP) |
| | 0.5 gram | disodium phosphate (OSP) |
| | 206.8 grams | deionized water |
| Sample V: | 49.6 grams | dye crude |
| | 0.5 gram | Tektamer 38 A.D. |
| | 2.6 grams | hexylene glycol |
| | 207.2 grams | deionized water |
| Sample VI: | 47.0 grams | dye crude |
| | 0.5 gram | Tektamer 38 A.D. |
| | 3.9 grams | Versenex 80 (DTPA pentasodium salt) |
| | 0.6 gram | acetic acid |
| | 194.3 grams | deionized water |
| Sample VII: | 50.8 grams | dye crude |
| | 0.5 gram | Tektamer 38 A.D. |

-continued

| | | |
|---|---|---|
| | 1.3 grams | trisodium phosphate (TSP) |
| | 1.2 grams | acetic acid |
| | 1.4 grams | sodium acetate |
| | 211.0 grams | deionized water |
| Sample VIII: | 50.2 grams | dye crude |
| | 0.5 gram | Tektamer 38 A.D. |
| | 2.6 grams | versene acid (EDTA free acid) |
| | 4.3 grams | sodium acetate |
| | 207.4 grams | deionized water |
| Sample IX: | 51.8 grams | dye crude |
| | 0.5 gram | Tektamer 38 A.D. |
| | 2.7 grams | Versinol 120 (N-HEDTA trisodium salt) |
| | 0.8 gram | acetic acid |
| | 215.7 grams | deionized water |
| Sample X: | 52.0 grams | dye crude |
| | 0.5 gram | Tektamer 38 A.D. |
| | 2.8 grams | neopentyl glycol |
| | 217.2 grams | deionized water |
| Sample XI: | 50.5 grams | dye crude |
| | 0.7 gram | Tektamer 38 A.D. |
| | 4.1 grams | succinic acid |
| | 6.4 grams | sodium acetate |
| | 214.5 grams | deionized water |
| Sample XII: | 55.7 grams | dye crude |
| | 7.3 grams | Versinol 120 |
| | 1.9 grams | acetic acid |
| | 226.9 grams | deionized water |

Each of the samples is separated into two portions. One of the two portions of each sample is stored at room temperature. The other portion is subjected to 15 heating cycles. One heating cycle equals 24 hours at 40° C. followed by 24 hours at room temperature. The initial pH and the pH at the conclusion of testing are shown in Tables 4 and 5.

TABLE 4

Samples At Room Temperature

| Sample | Compound (wt. %) | Initial pH | pH at 3 Mos. | pH Change 3 Mos. | pH at Six Mos. | pH Change Six Mos. |
|---|---|---|---|---|---|---|
| Control | (Clar.) | 5.20 | 4.76 | −0.44 | 4.55 | −0.65 |
| I | 0.5 Succinic Acid | 5.28 | 5.25 | −0.03 | 5.23 | −0.05 |
| II | 0.5 NTA | 5.10 | 5.08 | −0.02 | 5.05 | −0.05 |
| III | 1.0 Versene 220 | 5.38 | 5.32 | −0.06 | 5.25 | −0.13 |
| IV | 1.0 MKP 0.2 DSP | 5.66 | 5.49 | −0.17 | 5.31 | −0.35 |
| V | 1.0 Hexylene Glycol | 5.18 | 4.74 | −0.44 | 4.53 | −0.65 |
| VI | 1.6 Versene 80 | 5.20 | 5.17 | −0.03 | 5.11 | −0.09 |
| VII | 0.5 TSP | 5.13 | 5.11 | −0.02 | 5.09 | −0.04 |
| VIII | 1.0 Versene Acid | 5.00 | 5.00 | None | 4.99 | −0.01 |
| IX | 1.0 Versinol 120 | 5.53 | 5.49 | −0.04 | 5.42 | −0.11 |
| X | 1.5 Neopentyl Glycol | 5.18 | 4.70 | −0.48 | 4.50 | −0.68 |
| XI | 1.5 Succinic Acid | 4.84 | 4.82 | −0.02 | 4.82 | −0.02 |
| XII | 2.5 Versinol 120 | 5.65 | 5.63 | −0.02 | 5.60 | −0.05 |

TABLE 5

Samples After 15 Heating Cycles

| Sample | Compound (wt. %) | Initial pH | pH After 15 Heating Cycles | pH Change |
|---|---|---|---|---|
| Control | (Clar.) | 5.20 | 4.39 | −0.81 |
| I | 0.5 Succinic Acid | 5.28 | 5.25 | −0.03 |
| II | 0.5 NTA | 5.10 | 5.08 | −0.05 |
| III | 1.0 Versene 220 | 5.38 | 5.20 | −0.18 |
| IV | 1.0 MKP 0.2 DSP | 5.66 | 5.01 | −0.65 |
| V | 1.0 Hexylene Glycol | 5.18 | 4.30 | −0.88 |
| VI | 1.6 Versene 80 | 5.20 | 5.06 | −0.14 |
| VII | 0.5 TSP | 5.13 | 5.08 | −0.05 |
| VIII | 1.0 Versene Acid | 5.00 | 4.98 | −0.02 |
| IX | 1.0 Versinol 120 | 5.53 | 5.32 | −0.21 |
| X | 1.0 Neopentyl Glycol | 5.18 | 4.39 | −0.79 |
| XI | 1.5 Succinic Acid | 4.84 | 4.81 | −0.03 |
| XII | 2.5 Versinol 120 | 5.65 | 5.52 | −0.13 |

The data of Tables 4 and 5 show the stabilizing effect of the chelating agents of the present invention (Samples I, II, III, VI, VIII, IX, XI, and XII) over an extended storage period simulated by an accelerated aging technique. Compounds outside the scope of the present invention (Samples IV, V, and X), with the exception of Sample VII, did not show the desired stabilizing effect.

I claim:

1. An aqueous reactive dye composition stable to decomposition comprising:
    an aqueous solution containing from about 5.0 weight percent to about 50.0 weight percent of a water soluble reactive dye having at least one —$SO_2CH_2CH_2OSO_3H$ group; and
    at least one chelating agent selected from the group consisting of:
    (a) a polycarboxylic acid selected from the group consisting of tartaric acid, succinic acid, glutaric acid, adipic acid, and mixtures thereof;
    (b) an aminocarboxylate; and
    (c) mixtures of (a) and (b);
    said chelating agent being in a sufficient concentration to maintain the pH of said aqueous reactive dye composition from about 3.0 to about 7.0 for at least three months.

2. The aqueous reactive dye composition of claim 1, wherein the amino carboxylate is a member selected from the group consisting of nitrilotriacetic acid, ethylenediaminetetraacetic acid, diethylenetriaminepentaacetic acid, (N-hydroxyethyl)ethylenediaminetriacetic acid, and mixtures of these.

3. The aqueous reactive dye composition of claim 1, wherein said pH is from about 5.0 to about 6.5.

4. The aqueous reactive dye composition of claim 1, wherein said chelating agent is in a concentration of about 0.1 to about 3.0 weight percent.

5. The aqueous reactive dye composition of claim 4, wherein said chelating agent is in a concentration of about 0.5 to about 1.5 weight percent.

6. The aqueous reactive dye composition of claim 1, wherein said reactive dye has at least one sulfonic acid group.

7. An aqueous reactive dye composition stable to decomposition comprising;
    an aqueous solution containing from about 5.0 weight percent to about 50.0 weight percent of a water soluble reactive dye having at least one —$SO_2CH_2CH_2OSO_3H$ group; and
    at least one chelating agent, said chelating agent being an amino carboxylate in a free acid, ammonium, sodium, or lithium form, said chelating agent being in a sufficient concentration to maintain the pH of said aqueous reactive dye composition from about 3.0 to about 7.0 after at least three months of storage.

8. The aqueous reactive dye composition of claim 7, wherein said amino carboxylate is a member selected from the group consisting of nitrilotriacetic acid, ethylenediaminetetraacetic acid, diethylenetriaminepentaacetic acid, (N-hydroxyethyl)ethylenediaminetriacetic acid, and mixtures of these.

9. The aqueous reactive dye composition of claim 7, wherein said pH is from about 5.0 to about 6.5.

10. The aqueous reactive dye composition of claim 7, wherein said amino carboxylate is in a concentration of about 0.1 to about 3.0 weight percent.

11. The aqueous reactive dye composition of claim 10, wherein said amino carboxylate is in a concentration of about 0.5 to about 1.5 weight percent.

12. The aqueous reactive dye composition of claim 7, wherein said reactive dye has at least one sulfonic acid group.

13. The dye composition of claim 7, wherein said reactive dye is a copper plithalocyanine dye.

14. The aqueous reactive dye composition of claim 7 further comprising a polycarboxylic acid.

15. A method for stabilizing an aqueous reactive dye composition comprising:
   (a) forming an aqueous solution containing from about 5.0 weight percent to about 50.0 weight percent of at least one water-soluble reactive dye having at least one —$SO_2CH_2CH_2OSO_3H$ group; and
   (b) adding at least one chelating agent to said aqueous reactive dye solution in a sufficient concentration to maintain the pH of said composition from about 3.0 to about 7.0 for at least three months of storage, said chelating agent being selected from the group consisting of:
      (1) a polycarboxylic acid selected from the group consisting of tartaric acid, succinic acid, glutaric acid, adipic acid, and mixtures thereof;
      (2) an aminocarboxylate; and
      (3) mixtures of (1) and (2).

16. The method of claim 15, wherein-said chelating agent is added in a sufficient concentration to maintain said pH from about 5.0 to about 6.5 for at least six months of storage.

17. The method of claim 15, wherein said chelating agent is added in a concentration of about 0.1 to about 3.0 weight percent.

18. The method of claim 15, wherein said chelating agent is added in a concentration of about 0.5 to about 1.5 weight percent.

19. The method of claim 15, wherein said amino carboxylate is a member selected from the group consisting of nitrilotriacetic acid, ethylenediaminetetraacetic acid, diethylenetriaminepentaacetic acid, (N-hydroxyethyl) ethylenediaminetriacetic acid, and mixtures of these.

* * * * *